B. G. LAMME.
SYSTEM OF REGENERATIVE CONTROL FOR ELECTRIC MOTORS.
APPLICATION FILED NOV. 8, 1907. RENEWED MAY 20, 1910.
978,038.
Patented Dec. 6, 1910.
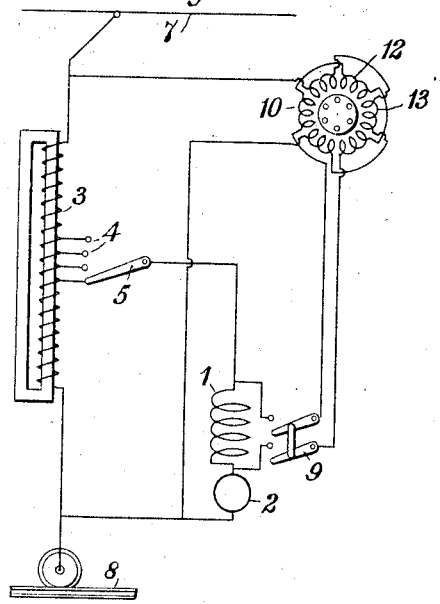
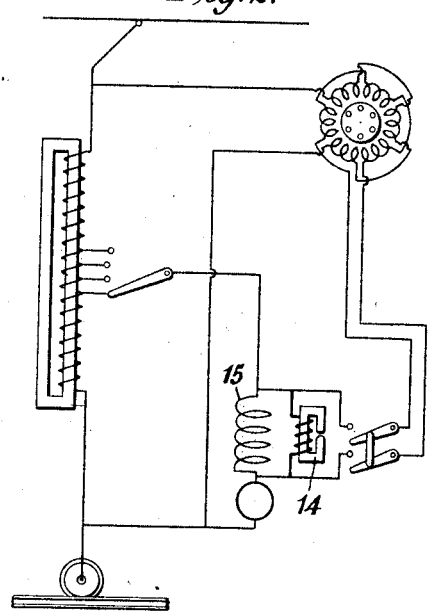
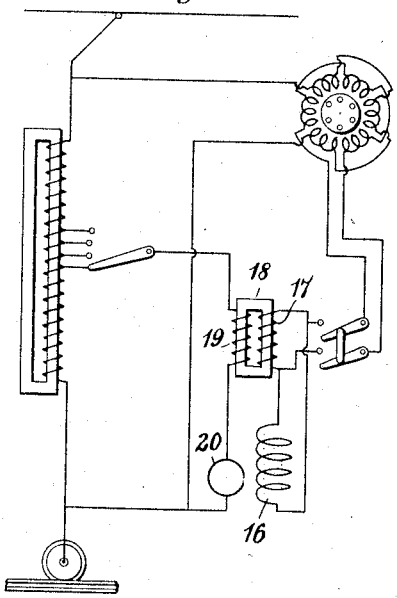
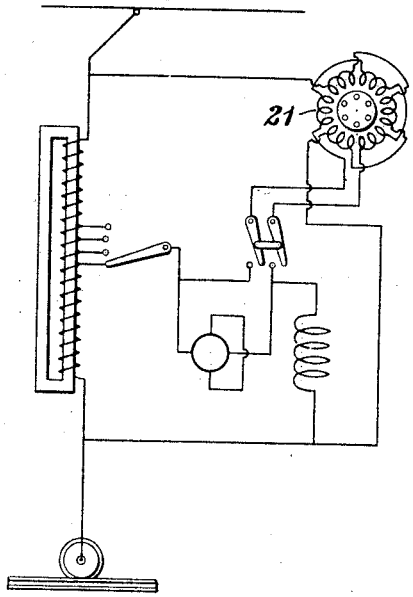
WITNESSES:
C. L. Belcher
Otto S. Schairer.
INVENTOR
Benjamin G. Lamme
BY
Kerby Clarr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF REGENERATIVE CONTROL FOR ELECTRIC MOTORS.

978,038.  Specification of Letters Patent.  Patented Dec. 6, 1910.

Original application filed March 15, 1906, Serial No. 306,218. Divided and this application filed November 8, 1907, Serial No. 401,323. Renewed May 20, 1910. Serial No. 562,525.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Systems of Regenerative Control for Electric Motors, of which the following is a specification, this application being a division of application Serial No. 306,218, filed March 15, 1906.

My invention relates to dynamo-electric machines and particularly to motors of the commutator type of construction having series connected field magnet and armature windings.

The object of my invention is to provide a method of, and means for, operating motors of the character indicated such that they may be caused to operate as generators, under stable conditions, or under conditions that may be controlled.

In the operation of an electric railway vehicle, it is frequently desirable, as for instance, when the vehicle descends a grade, to cause the propelling motors to operate as generators in order that the kinetic energy of the vehicle may be saved by converting it into electrical energy and supplying it thus to the distributing circuit. Vehicle motors are generally of the commutator type of construction and the field magnet and armature windings thereof are usually connected in series relation. It has been found, under certain conditions, that the current supplied by such motors when operating as generators will increase, and this causes an increase of the field strength. This, in turn, causes the voltage of the generator to increase so that abnormal amounts of power may be supplied to the distributing circuit. Thus a motor may operate as a very powerful dynamic brake rather than as a generator, the operation of which may be controlled.

In order that a motor may be caused to operate as a generator under stable conditions, or under conditions that may be governed, it is obviously necessary that the field strength be maintained substantially constant or that it be under control. In two other applications, serially numbered 306,217 and 306,218, filed March 15, 1906, I have claimed both broadly and specifically methods and means whereby such conditions of operation may be secured. According to the arrangements covered specifically in the latter application, of which the present application is a division, the dynamo-electric machine is connected to the distributing circuit while the field magnet winding is supplied from a phase-changing device that is interposed between the said winding and the distributing circuit, the electromotive force applied to the field magnet winding being of such a phase that the electromotive force applied to the distributing circuit by the armature is approximately in phase with the electromotive force of the circuit. Obviously, in that arrangement the phase-changing device must be of sufficient capacity to supply all of the exciting current for the field magnet winding, and may, for that reason, be unnecessarily expensive. The present arrangement is such that but a very small phase-changing device need be employed.

Figure 1, of the accompanying drawing, is a diagrammatic view of a system that embodies my invention and Figs. 2, 3, and 4 are modifications of the system of Fig. 1.

An electric motor of the commutator type of construction having series connected field magnet and armature windings 1 and 2 is connected to, and is supplied from, a subdivided transformer winding 3 to the various points of sub-division of which are connected stationary contact terminals 4 with which a movable contact arm 5 is adapted to engage, the voltage applied to the motor being regulated by adjusting the position of the said contact arm. The transformer winding 3 is supplied from a trolley conductor 7 and a track rail 8 of an electric railway system upon which a vehicle may be operated by means of the motor. During normal operation of the motor, the field magnet strength is permitted, as usual, to vary in accordance with the load upon the motor, the speed of the motor being adjusted by varying the voltage applied thereto. When, however, it is desired to employ the motor as a generator, as, for instance, when the vehicle upon which the motor is employed descends a grade or coasts, it is essential that the field magnet strength be maintained substantially constant or be subject to manual control, and, for that reason, a switch 9 is employed to connect a suitable source of current 10 in shunt to the field magnet winding for the purpose of maintaining the potential difference between the terminals of the field magnet winding substantially invariable. Any suitable source of alternating current may, of course, be connected in shunt to the field magnet winding 1, but, preferably, the device will derive its energy from the distributing circuit, and may be a continuously running machine of the induction motor type having two windings 12 and 13 so disposed with reference to each other that the phase of the electromotive force applied to the field magnet winding will be such that the electromotive force applied to the transformer winding 3 by the motor, when operating as a generator, will agree in phase with that of the transformer.

The voltage applied to the field magnet winding from the phase-changing device may be so adjusted that it will equal the normal or other predetermined drop of potential in the field magnet winding; that is, under normal conditions of operation of the motor as a generator, the phase-changing device will remain substantially inactive and will not supply current to the field magnet winding nor will it derive current from the motor circuit. However, if the current that traverses the armature falls below the normal value, the deficit of current will be supplied to the field magnet winding by the phase-changing device, and, on the other hand, if the current traversing the motor armature exceeds the normal value, the excess of current will be supplied to the phase-changing device, thus preventing it from traversing the field magnet winding. In this manner, the field strength may be maintained substantially constant.

In the before mentioned application, Serial No. 306,217, I have shown and described means whereby direct current may be prevented from traversing the field magnet winding in order to prevent the motor from automatically becoming a generator of direct current upon reversal of the connections of the field magnet and armature windings with reference to each other while the vehicle is in motion. A like result may be secured, as indicated in Fig. 2, in which an impedance device 14 is connected in shunt relation to field magnet winding 15, the ohmic resistance of the device being low, as compared with that of the field magnet winding, and its inductive resistance being high as compared with that of the field magnet winding. It will be understood that, when the circuits are so arranged, if direct current traverses the motor circuits, only a very small portion of it will be permitted to traverse the field magnet winding 15, and the field strength will consequently be insufficient to enable the motor to become a generator of direct current. However, when alternating current traverses the motor circuits, very little of it is permitted to traverse the impedance device because of its high inductance. Another means which may be employed for preventing direct current from traversing the field magnet is that which is shown in Fig. 3, in which the field magnet winding 16 is supplied from the secondary winding 17 of a transformer 18, the primary winding 19 of which is connected in series with the armature 20. Obviously, the mode of operation remains substantially the same and it is immaterial whether the windings be connected directly in series or not, so long as the field magnet winding is supplied with current that is equal, or proportional in amount, to that which traverses the armature when the machine is operated as a motor.

The invention may also be employed in connection with motors of the series repulsion type as illustrated in Fig. 4 in which the phase-changing device 21 is connected in shunt to the circuit that is traversed by the exciting current of the machine.

I claim as my invention:

1. The combination with a dynamo-electric machine adapted for operation either as a motor or as a generator and provided with series-connected field magnet and armature windings, of a source of current to be connected in shunt circuit to the field magnet winding when the machine is operated as a generator.

2. The combination with a dynamo-electric machine adapted for operation either as a motor or as a generator and provided with series-connected field magnet and armature windings, of a source of current to be connected in shunt circuit to the field magnet winding when the machine is operated as a generator, and means for preventing direct current from traversing the field magnet winding.

3. The combination with a dynamo-electric machine adapted for operation either as a motor or as a generator and provided with series-connected field magnet and armature windings, of a source of energy to be connected in shunt circuit to the field magnet winding when the machine is operated as a generator, the voltage of the source being approximately equal to the normal or predetermined drop of potential in the field magnet winding.

4. The combination with a dynamo-electric machine adapted for operation either as a motor or as a generator and provided with field magnet and armature windings, of means whereby the field magnet winding is supplied with current proportional in amount to that which traverses the armature when the machine is operated as a motor, and a source of current to be connected in shunt circuit to the field magnet winding when the machine is operated as a generator.

5. The combination with a dynamo-electric machine adapted for operation either as a motor or as a generator and provided with field magnet and armature windings, of means whereby the field magnet winding is supplied with current proportional in amount to that which traverses the armature when the machine is operated as a motor, and whereby direct current is prevented from traversing the same, and a source of current to be connected in shunt circuit to the field magnet winding when the machine is operated as a generator.

In testimony whereof, I have hereunto subscribed my name this 29th day of Oct., 1907.

BENJ. G. LAMME.

Witnesses:
　ALBERT KINGSBURY,
　BIRNEY HINES.